June 9, 1936. H. A. MUSHAM 2,043,444
BRAKE DEVICE
Original Filed Dec. 22, 1930 2 Sheets-Sheet 2
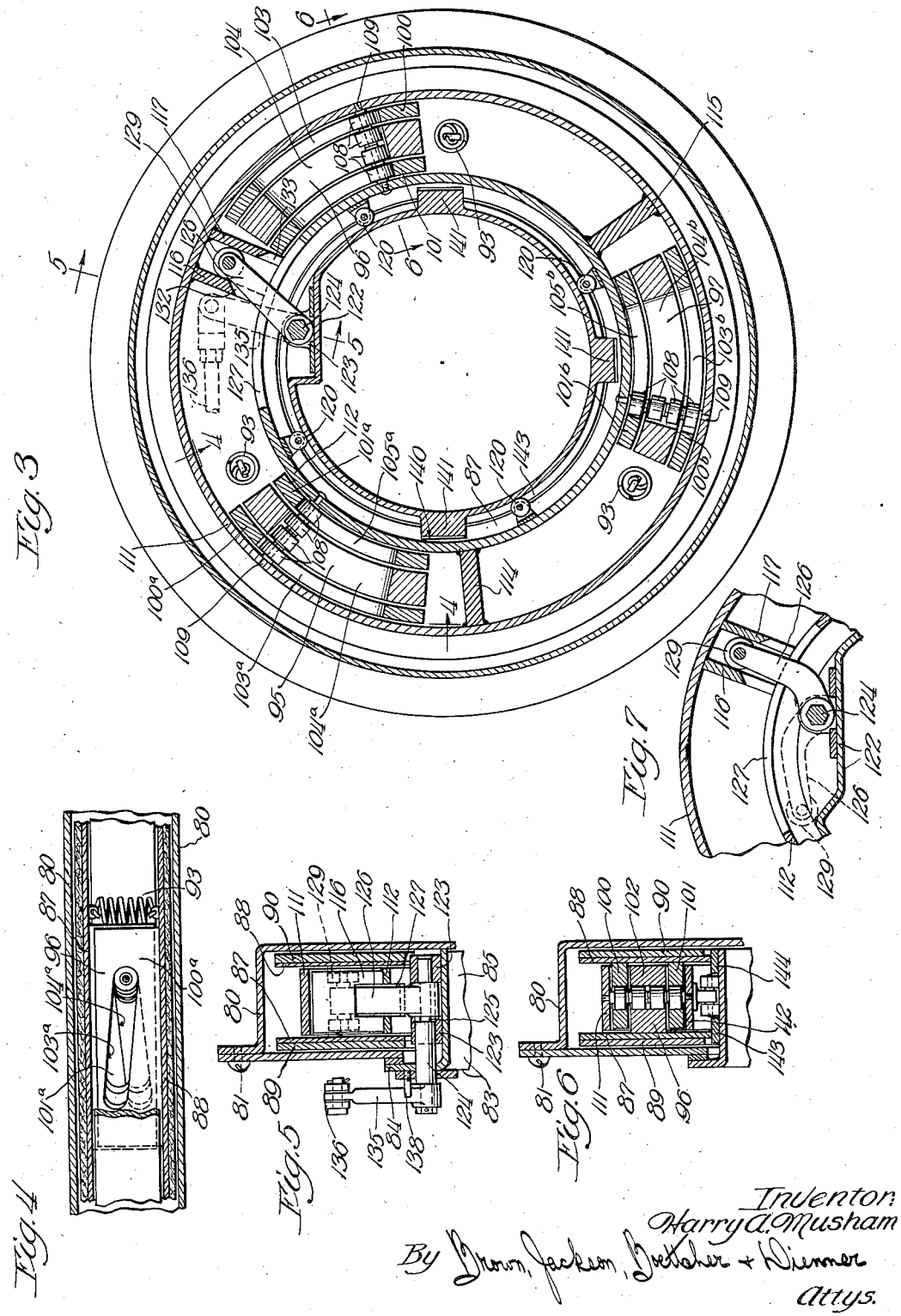
Inventor:
Harry A. Musham
By [Attorneys signature]
Attys.

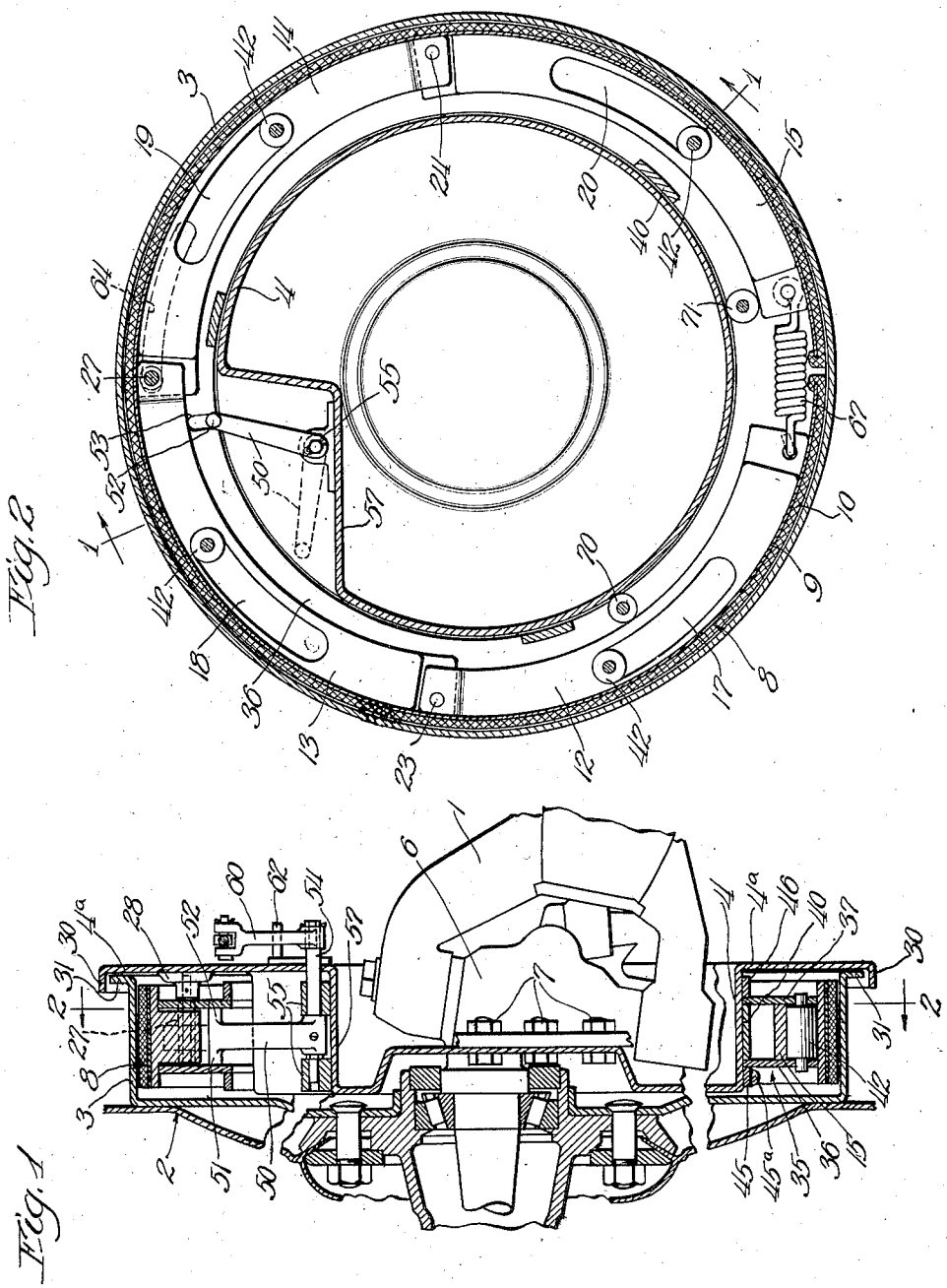

Patented June 9, 1936

2,043,444

UNITED STATES PATENT OFFICE 2,043,444

BRAKE DEVICE

Harry A. Musham, Chicago, Ill.

Application December 22, 1930, Serial No. 503,898
Renewed November 27, 1935

14 Claims. (Cl. 188—78)

The present invention relates generally to improvements in brakes for automobiles and other vehicles, and more particularly to improvements in brakes of the internal expanding type.

More particularly, the present invention is principally concerned with, and has for its principal object, the provision of an improved internal expanding brake wherein the number of parts have been reduced and simplicity and ruggedness of construction have been attained.

The present invention is also concerned with the provision of an improved brake structure wherein the brake operating parts may be conveniently and easily removed as a unit for replacement or repair where necessary and which can be easily adjusted.

Another object of the present invention is the provision of improved friction elements and cooperating parts wherein ease and smoothness of operation is assured throughout the entire life of the wearing parts, together with ease and convenience in making such adjustments as may be necessary from time to time.

Other objects and advantages of the present invention will be apparent to those skilled in the art after a consideration of the following detailed description of the several embodiments of the invention, taken in conjunction with the accompanying drawings, in which:

Figure 1 is a substantially vertical cross section through a brake structure embodying the present invention and corresponding to a view taken substantially along the line 1—1 of Figure 2 looking in the direction of the arrows;

Figure 2 is a vertical view, partly in section and partly in elevation, taken substantially along the line 2—2 of Figure 1;

Figure 3 is a view corresponding to Figure 2 but illustrating a modified form of brake;

Figure 4 is a view taken substantially along the line 4—4 of Figure 3;

Figure 5 is a view taken along the line 5—5 of Figure 3;

Figure 6 is a view taken along the line 6—6 of Figure 3; and

Figure 7 is a fragmentary view showing a slightly modified form of operating means for the brake illustrated in Figure 3.

Referring now to the drawings, particularly to Figures 1 and 2, the reference numeral 1 indicates the front axle of an automobile or similar vehicle and 2 indicates in its entirety a front wheel journaled on the axle 1. While I have shown a front axle and a front wheel it is to be understood that the essential characteristics of the invention as embodied in the brake illustrated in Figure 1 are equally applicable to a brake for a rear wheel.

The wheel 2 carries a rotatable brake drum 3 of the usual type. The front axle 1 carries a stationary or supporting drum 4 preferably arranged in concentric relation with respect to the rotatable brake drum 3. The stationary support or drum 4 may be secured in any manner desired to the front wheel spindle 6, as by bolts 7 or any other equivalent means.

A brake shoe 8 comprising a flexible resilient strap 9, preferably formed of spring steel, and a brake lining 10 which may be molded or otherwise secured to the strap 9, is mounted closely adjacent the inner or braking surface of the drum 3 and preferably extends substantially entirely around the same, as shown in Figure 2. The brake strap or shoe 8 is carried by a plurality of segmental brake shoes 12, 13, 14 and 15, see Figure 2, each of which includes a cam element or member providing slots 17, 18, 19 and 20, respectively, the walls of which are inclined with respect to the surface of the brake shoe 8 which, it will be noted, is substantially concentric with respect to the stationary member 4 and the rotatable brake drum 3.

The members 12, 13, 14 and 15 are pivotally connected together in serial arrangement by means of pivot pins 23 and 24 carried, respectively, on members 12 and 13 and members 14 and 15. Members 13 and 14 are connected together by means of a stationary pivot pin or abutment 27 fixed in a boss 28 at the upper part of the stationary drum 4. The boss 28 is formed in the radial flange 4a, the latter being provided with a laterally directed flange or edge 30 overlying the radial flange 31 carried by the rotatable brake drum 3, these parts cooperating to prevent the entry of dust, dirt, and the like. The brake strap or shoe 8 is preferably secured to each of the brake members 12, 13, 14 and 15 by screws, rivets, or the like, and the natural resiliency of the spring strap 9 is utilized in moving the brake lining 10 and elements 12, 13, 14 and 15 out of frictional engagement with the braking surface of the brake drum 3.

For moving the brake shoes or elements 12, 13, 14 and 15 so as to cause engagement between the brake lining 10 and the rotatable brake drum 3 I provide a roller cage structure, indicated in its entirety by the reference numeral 35 in Figure 1. The cage 35 comprises a pair of transversely spaced rings 36 and 37 which are held in spaced relationship and connected together by transverse bars 40 whereby the rings 36 and 37 are constrained to act together. A plurality of rollers 42 are journaled between the cage rings 36 and 37, the rollers 42 being provided with suitable spindles for this purpose. These rollers are received in the cam slots 17, 18, 19 and 20, as best shown in Figure 2.

The inner diameters of the cage rings are the same and are such that the cage 35 is rotatable on the cylindrical portion of the stationary support or drum 4. Since the brake shoes 12, 13, 14 and 15 are anchored to the flange 4a of the stationary drum 4 by means of the stationary pivot 27 rotation of the cage 35 with respect to the drum 4 will cause the rollers 42 to move in their respective slots and by virtue of the inclination of the walls of these slots with respect to the circumference of the brake drum 3 the brake shoes 12, 13, 14 and 15 will be caused to move radially with respect to the brake drum 3 and will therefore cause the brake shoe 8 to be carried toward and away from the interior braking surface of the brake drum 3. Preferably the width of the slots exceed the diameter of the rollers 42 by only a slight amount, which is on the order of 0.001 of an inch. This assures that the elements 42 will roll instead of sliding in their respective slots.

A pair of rings 45 and 46 maintain the roller cage 35 in proper position on the cylindrical portion of the stationary drum 4, and either one or both of these rings, preferably the outer ring 45, is made removable for a purpose which will appear hereinafter.

For moving the roller cage circumferentially of the stationary drum 4 in order to apply and release the brakes, I provide an operating means in the form of a T-shaped lever 50 having at its upper end laterally directed portions 51 and 52 which are respectively received in slots 53 formed in the cage rings 36 and 37. The roller end of the lever 50 is secured to a rock shaft 54 journaled in bearings 55 carried in an inwardly directed recess 57 which interrupts the continuity of the circumference of the stationary drum 4 and which is preferably formed integrally therewith. This type of construction provides a simple and inexpensive means for supporting the operating means for the brake shoes. At its outer end, that is, the end extending beyond the flange 4a, the shaft 54 carries an arm 60 which may be operated in any manner desired from the brake pedal of the automobile or the equivalent thereof. The outer end of the rock shaft 54 is of polygonal form and the corresponding end of the arm 60 received thereon is provided with a correspondingly formed aperture. In the structural embodiment illustrated the outer end of the rock shaft 54 is hexagonal. This provides a construction wherein after the brake lining has become worn the lever 60 may be adjusted to a new position on the rock shaft 54 to bring the brake pedal or other operating means back to its normal brake engaging position. The stationary drum 4 also carries a stop pin 62 for limiting the forward or brake disengaging position of the operating lever 60.

In order to accommodate movement of the cage ring 37 with respect to the stationary pivot pin or stud 27 the ring 37 is provided with an arcuate slot 64. It is also to be noted that the walls of the slots 17, 18, 19 and 20 are substantially parallel. By virtue of this construction movement of the rollers in one direction will positively cause the brake shoes to move outwardly while movement of the rollers 42 in the other direction will positively retract the brake shoes and cause them to move inwardly. This type of construction provides a positively acting brake and is an important feature of the present invention, particularly where the brake releasing operation is augmented by the resiliency of the spring steel strap 9. This operation may be further augmented by means of a coil spring 67 connected to the adjacent ends of brake shoes 12 and 15 and which, as will be seen from Figure 2, is substantially diametrically opposite the anchor post or stationary pivot 27. Preferably, also, the ends of the brake shoe 8 are brought into substantial contact and the ends of the lining 10 may be turned about and secured to the ends of the strap 9, as best shown in Figure 2.

From Figure 2 it will be noted that the extreme or free end of the brake shoe 12 is at a substantial distance from the roller 42 operating in the cam slot 17 thereof. This corresponds to the condition when the lining 10 is new. In order, therefore, to insure the effective gripping of the rotatable brake drum 3 even at the outermost end of the brake shoe 12 I provide an auxiliary roller 70 which is similar to and is journaled in substantially the same manner as the rollers 42 shown in both Figures 1 and 2. The roller 70 operates upon the inner surface of the brake shoe 12, and this surface is parallel with respect to the inclined surfaces of the slot 17. As the cage 35 is moved in a counterclockwise direction as viewed in Figure 2 it will be seen that the roller 70 as well as the roller 42 operates to expand the brake shoe 8 against the surface of the brake drum 3. By virtue of this construction uniform application of the brakes is assured.

Referring now to the opposite brake shoe 15, it will be seen that something like an opposite condition exists here. That is, when the brake lining 10 is worn and the roller 42 operates very close to the upper end of the slot 20 the free end of the brake shoe 15 is at quite a distance from the roller 42. In order that the extreme or free end of the brake shoe 15 may be pressed into frictional engagement with the inner braking surface of the brake drum 3 with substantially the same force as the other shoes and other portions of the brake shoe 15 I provide an auxiliary roller 71 journaled on the cage rings 36 and 37 in substantially the same manner as the auxiliary roller 70. Preferably, both rollers 70 and 71 are so arranged that they clear the outer surface of the cylindrical portion of the stationary drum 4.

One important feature of the brake construction just described is the arrangement whereby practically all of the operative parts may be removed as a unit for inspection or repair. After the wheel 2 is removed, together with the brake drum 3 connected therewith, the outer cage retaining ring 45 may be removed by taking out the screws 45a securing the ring in position. When this is accomplished the entire brake shoe and roller cage assembly may be slipped off the supporting drum 4. This is possible in the first place because the pivot pin 27 on the flange 4a is straight and the brake shoes 15 and 14 may be slipped therefrom. At the same time the form of the slot 53 is such that in the position shown in Figure 2 the rings 36 and 37 clear the upper end of the lever 50 when the cage and associated brake shoes are moved directly outwardly.

If under certain conditions the rings 36 and 37 will not clear the upper end of the lever 50, the latter may be turned to the position shown in dotted lines in Figure 2 in order to entirely withdraw the laterally directed portions 51 and 52 from the slots 53. When so withdrawn the lever 50 lies inside the roller cage and hence the brake shoe and roller cage assembly may be removed from the stationary support 4. It is also possible to remove the brake shoe and roller cage assembly when the lever 50 is in a position somewhere intermediate the position shown in full lines in Figure 2 and the position shown in dotted lines.

The modification shown in Figures 3 to 7, inclusive, illustrates the application of the present invention to a type of brake known as the disc brake wherein the braking surfaces are in a plane transverse to the axis of rotation of the rotating parts. In this modification the reference numeral 80 represents the brake drum mounted to rotate with an automobile wheel, and the brake drum 80, as best shown in Figures 5 and 6, comprises a pair of housing or plate members suitably secured together, as by bolts 81 or the equivalent thereof. The brake drum 80 is adapted to be carried by the automobile wheel in a manner similar to that in which the brake drum 3 is carried by the wheel 2 in the modification illustrated in Figure 1. A stationary supporting drum 83 including the radial flange 84 and the cylindrical portion 85 is carried by the axle of the automobile.

A pair of brake discs or shoes 87 and 88, carrying brake linings 89 and 90 of any suitable form, are mounted between the two interior braking surfaces of the brake drum 80 and in operative association therewith. These brake discs or shoes are adapted to be retracted toward one another and away from the sides of the brake drum 80 by means of a plurality of coil springs 93 shown in Figures 3 and 4. The brake shoes 87 and 88 are adapted to be moved outwardly into frictional engagement with the sides of the brake drum 80 by a number of cam elements or members somewhat similar in form and function to the cam elements 12, 13, 14 and 15 shown in Figure 2. In this modification, however, the cam members are arranged in three sets designated, in Figure 3, by the reference numerals 95, 96 and 97.

Referring now more particularly to Figure 6, which is a section taken through the set of cam elements 96, it will be observed that the brake shoe 88 carries a pair of cam elements 100 and 101 which are curved in an arc substantially concentric with respect to the axis of rotation of the rotating brake drum 80. A third cam member 102 is secured to the brake disc 87 and is received between the cam elements 100 and 101, as best shown in Figure 6. The other sets of cooperating cam elements 95 and 97 are substantially identical with the elements 100, 101 and 102 of the set of elements 96 just described.

The cam elements comprising each of the sets 95 to 97 are provided with cooperating cam slots, best illustrated in Figure 4 which shows the set of cam elements 96. From this figure it will be observed that slot 103a carried by the element 100a slants or is inclined in one direction with respect to the plane of the brake drum 80 while the slot 104a is inclined or slants in the other direction. The cam element 101a also carries a cam slot 105a corresponding in angle and dimension to the slot 103a formed in the cam element 100a. Each of the other sets of cam elements are provided with cam slots arranged in substantially the same manner and a description of one, as given above, will be sufficient.

As shown in Figure 4 the cam slots coincide at one end and diverge outwardly toward the sides of the brake drum 80 at the other end. Where the slots coincide they receive an assembly of antifriction elements comprising a plurality of rollers 108 mounted on a spindle 109 and separated from one another by washers or the equivalent. The spindle 109 is carried at its ends by a pair of spaced cage rings 111 and 112 concentrically arranged with respect to the brake drum 80 and extending entirely around the stationary support 83. These antifriction means or rollers operate in the cam slots and when the cage 111—112 is shifted relative to the brake shoes the rollers operating in the cam slots force the brake shoes 87 and 88 apart and into frictional engagement with the sides of the brake drum 80. Rollers 108 and spindles 109 are provided for the other sets of cam elements as best shown in Figure 3. The cage rings 111 and 112 are rigidly secured together by means of intermediate webs 114 and 115 and a pair of closely spaced webs 116 and 117. These webs may be secured in any manner to the cage rings, as by welding or the like, and serve to reinforce the cage rings 111 and 112 and to cause the cage rings to move as a unit. The inner cage ring 112 carries a plurality of rollers 120 operating upon the outer surface of the cylindrical portion 85 of the stationary drum 83 and serves to permit the movement of the cage relatively thereto.

The operating means for shifting the roller cage will now be described. As in the modification illustrated in Figure 2, the cylindrical portion 85 of the stationary drum 83 is interrupted by a depression or shelf 122 extending inwardly a short distance and which provides a journal support 123 for a rock shaft 124 upon which is provided a hexagonal section 125 adjustably receiving the cage operating lever 126. The lever 126 extends upwardly through a slot 127 formed in the inner cage ring 112 and at its outer end the lever carries rollers 129 received between the closely spaced radial webs 116 and 117. These webs have outwardly extending slots 132 and 133 providing for swinging movement of the operating lever 126.

One end of the rock shaft 124 extends through the radial flange 84 of the stationary drum 83, which end carries an operating arm 135 which is connected with the brake operating linkage 136 in any desired manner. A stop pin 138 may be provided for limiting the movement of the brake operating arm 135 in one direction. The end of the rock shaft 124 which receives the brake operating arm 135 may be hexagonally formed in order to provide angular adjustment of the arm 135 to compensate for wear of the brake linings in the same manner as the arm 60 is adjustably mounted on the rock shaft 54 in the modification illustrated in Figure 1.

The brake shoes 87 and 88 are extended inwardly beyond the brake linings 89 and 90 and these inward portions are notched, as at 140, to receive the splines or abutments 141 carried by the cylindrical portion 85 of the stationary drum 83. Any number of such splines may be provided, three being shown by way of illustration only. These splines 141 restrain the brake shoes or discs 87 and 88 from rotating with the brake drum but permit their lateral movement with respect to one another so that the brakes may be applied and released by shifting the brake operating cage in one direction or the other around the cylindrical portion 85 of the stationary drum 83. The portion 85 carries guide rings 143 and 144 best shown in Figure 6 which serves to maintain the roller cage in proper position on the stationary drum. These rings 143 and 144 may be divided into sections and mounted between the splines 141.

The sections of the rotating brake drum 80 are separable and the outer guide ring 144 is removable, and in order to provide for ready and convenient removal of the brake elements as a unit the brake operating lever 126 and the shelf 122 may be formed in the manner shown in Figure 7 from which it will be noted that after the wheel and outer brake drum sections are removed the lever 126 may be swung down underneath the inner cage ring 112 so that the entire brake assembly may be removed by simply slipping the brake shoes outwardly along the splines 141. Before moving the lever 126 to its retracted position inside the inner cage ring 112 it may be desirable or necessary to disengage the brake operating linkage 136 from the brake operating arm 135.

It is to be noted that in both modifications of my improved brake I have made the roller cage the movable or shiftable element for purposes of illustration and have provided means for preventing the rotation of the brake shoe which is, therefore, the stationary element. While this is the preferred arrangement, it is to be understood that the movements of the brake shoes and the roller cage may be interchanged.

Another feature of considerable importance in the present invention, and one which is exhibited by both of the modifications described above, is the non-locking feature of the present construction. This is present whether the vehicle is moving forwardly or rearwardly. This will be understood by considering that the reaction of the force with which the brake shoes grip or are pressed against the brake drum is in a radial direction and is directed inwardly against the rollers. As soon, therefore, as pressure on the brake pedal is released, this reaction, exerted against the rollers and directed radially inwardly, is effective to cause the rollers to move in the slots in the brake shoes toward their retracted position. This means that the instant the brake pressure is released the brake shoes are urged away from the brake drum.

By virtue of the provision of the curved slots in the brake shoes in both modifications, which slots function as wedges, it is possible to form the inclination or angularity so that any desired multiplication of force or mechanical advantage may be obtained. By the use of my invention a person is enabled to stop the heaviest vehicle with only a slight pedal pressure.

It is to be noted that, where in the modification shown in Figures 1 and 2 I preferably mount the brake lining by molding or otherwise securing it onto a thin strip and then fasten the strip to the brake shoes, in the modification shown in Figures 3 to 7 the brake lining there disclosed is secured by molding or otherwise directly to the brake shoes or discs 87 and 88. It is to be understood, however, that the brake linings 89 and 90 may, if desired, be molded to a relatively thin disc or plate first and then the plate or disc secured in any desired manner to the brake shoes 87 and 88, as exemplified by the manner in which the brake linings are mounted in the modification shown in Figures 1 and 2.

While I have shown and described the preferred structure in which the present invention is embodied it is to be understood that my invention is not to be limited to the specific details shown and described but that, in fact, widely different means may be employed in the practice of the broader aspects of my invention.

What I claim, therefore, and desire to secure by Letters Patents is:

1. A brake for vehicles comprising a rotating drum, a stationary member including an integrally formed support having a radially extending flange and a cylindrical portion, the latter having its cylindrical surface interrupted by an inwardly extending recess, a plurality of brake shoes movable toward and from said drum and each including cam surfaces, a brake operating cage having means cooperating with said cam surfaces, said cage being supported on the cylindrical portion of said support, and means journaled in said recess for actuating said cage.

2. A brake for vehicles comprising a rotating drum, a stationary member including an integrally formed support having a radially extending flange and a cylindrical portion, the latter having its cylindrical surface interrupted by an inwardly extending recess, a plurality of brake shoes movable toward and from said drum and each including cam surfaces, a brake operating cage having spaced rollers cooperating with said cam surfaces to expand and contract the brake shoes, said cage being supported on the cylindrical portion of said support, removable guide rings secured to said support for guiding said cage, and means acting as a one-tooth gear for actuating the cage.

3. A brake for a rotating part comprising a stationary support, a rotating drum moving with said rotating part, a plurality of flexibly connected brake shoes adapted to be moved in frictional contact with said drum, means on the stationary support for removably receiving the shoes, and for preventing rotation thereof, a brake operating cage having means for moving all of said shoes into contact with said drum to retard rotation of the same, means for moving the cage and from which the latter is removable, and a guide ring on said stationary support and removably secured thereto, the removal thereof permitting the removal of said cage and brake shoes as a unit.

4. A brake for a rotating part comprising a stationary support, a rotating drum moving with said rotating part, a laterally directed abutment fixed on said support, a brake shoe removably mounted thereon and restrained from rotation thereby, means for moving said shoe against the drum, said means having laterally directed movable means cooperating with said shoe and from which the shoe is removable, and means removably secured to said stationary support for holding said parts in operative relation, the removal of said last named means permitting the removal of said brake shoe and associated means as a unit.

5. A brake for vehicles comprising a one piece stationary brake support having a cylindrical surface interrupted by a depression forming a shelf and a radial flange, a plurality of brake shoes carried adjacent the flange and movable about said cylindrical surface, and means for moving the shoes to and from operating position, said means including a part mounted on said shelf.

6. A brake for automobiles or the like comprising a brake drum, a stationary support having a cylindrical surface, a plurality of brake shoes serially connected end to end and carried by said support, said brake shoes having integrally formed cam surfaces therein, and means movable around said surface for engaging said cam surfaces to move said brake shoes into and out of frictional contact with said drum.

7. A brake for automobiles or the like comprising a brake drum, a stationary support having a cylindrical surface, a plurality of brake shoes pivotally connected end to end and carried by said support, said shoes having cam openings formed therein, a cylindrical roller cage movable around said surface and cooperating with said cam openings on said brake shoes for moving said shoes into and out of frictional contact with said drum.

8. A brake for automobiles or the like comprising a brake drum, a stationary support having a substantially cylindrical surface, a plurality of serially connected brake shoes carried by said support, and a roller cage movable around said surface and cooperating with cam elements formed in said brake shoes for moving them into and out of frictional contact with said drum.

9. A brake for automobiles or the like comprising a brake drum, a stationary support having a substantially cylindrical surface, a plurality of serially connected brake shoes carried by said support forming a substantially continuous pressure applying means, and a roller cage movable around said surface and cooperating with cam elements formed in said brake shoes for moving them into and out of frictional contact with said drum, the cam elements on the brake shoes being of a length and inclination providing for substantial multiplication of power whereby the brake is adapted for use on a heavy vehicle.

10. A brake for vehicles comprising a brake drum, a stationary support having a substantially cylindrical surface, a roller cage movable around said support, a friction band for engaging said drum, a plurality of arcuate brake shoes having adjacent ends pivotally connected together for carrying said band, cam elements formed in each of said brake shoes, means for anchoring said series of shoes with respect to said stationary support, and cam means carried by said cage and engaging said cam elements for moving said shoes inwardly and outwardly of said support for disengaging and engaging said band with said drum.

11. In a brake structure for a vehicle, a plurality of brake shoes of elongated arcuate form and of increasing thickness from one end to the other to form thereon a cam surface along the inner edge thereof, a second cam surface formed within each of said shoes, and means for pivotally connecting the adjacent ends of said shoes.

12. A disc brake for vehicles comprising a rotatable drum having a pair of spaced braking surfaces, a pair of friction brake shoes between said spaced braking surfaces, a pair of cam members on one of said shoes, a cam member on the other of said shoes engaging between said cam members of said first shoe, and roller means common to all three of said cam members for expanding said brake shoes against said braking surfaces.

13. In a disc brake having spaced braking surfaces and a pair of friction brake shoes between said braking surfaces, the combination of a pair of inwardly extending actuating members on one of said shoes, an actuating member on the other of said shoes extending between said pair of members, cam means in the actuating members of each of said shoes diverging oppositely outwardly from a common point, and roller means common to said cam means for expanding said shoes against said braking surfaces.

14. In combination, a brake drum, a stationary cylindrical support disposed therein, a plurality of arcuately shaped brake shoes pivotally connected together and having their inner edges defining a plurality of cam surfaces adjacent the periphery of said cylindrical support, a friction band carried by said shoes for engaging said drum, cam slots formed in each of said shoes, a roller cage member rotatable about said support and having cam means for moving said shoes inwardly and outwardly of said drum to engage and disengage said friction band therewith, and roller means between the inner edges of said shoes and stationary support for preventing rocking movement of said brake shoes upon actuation of said shoes by said cam means.

HARRY A. MUSHAM.